(12) United States Patent
Shi et al.

(10) Patent No.: US 11,434,175 B2
(45) Date of Patent: Sep. 6, 2022

(54) METHOD OF FORMING A BORON NITRIDE (BN) NANOTUBE INTERFACE COATING ON CERAMIC FIBERS

(71) Applicants: Rolls-Royce Corporation, Indianapolis, IN (US); Rolls-Royce High Temperature Composites Inc., Cypress, CA (US)

(72) Inventors: Jun Shi, Carmel, IN (US); Sungbo Shim, Irvine, CA (US)

(73) Assignees: ROLLS-ROYCE CORPORATION, Indianapolis, IN (US); ROLLS-ROYCE HIGH TEMPERATURE COMPOSITES INC., Cypress, CA (US)

( * ) Notice: Subject to any disclaimer, the term of this patent is extended or adjusted under 35 U.S.C. 154(b) by 193 days.

(21) Appl. No.: 16/890,203

(22) Filed: Jun. 2, 2020

(65) Prior Publication Data
US 2020/0385314 A1 Dec. 10, 2020

Related U.S. Application Data

(60) Provisional application No. 62/856,910, filed on Jun. 4, 2019.

(51) Int. Cl.
*C04B 35/628* (2006.01)
*C04B 41/45* (2006.01)
(Continued)

(52) U.S. Cl.
CPC .. *C04B 35/62868* (2013.01); *C04B 35/62281* (2013.01); *C04B 41/4564* (2013.01); *C25D 9/04* (2013.01)

(58) Field of Classification Search
CPC ........ C04B 35/62868; C04B 35/62281; C04B 35/80; C04B 41/4564; C04B 2235/3826;
(Continued)

(56) References Cited

U.S. PATENT DOCUMENTS 10,093,585 B2   10/2018  Sheedy et al.
2017/0057879 A1*  3/2017  Harris ............... C04B 35/58028

OTHER PUBLICATIONS

Hurst et al. Boron Nitride Nanotubes Grown on Commericial Silicon Carbide Fiber Tow and Fabric. Nanostructured Materials and Nanotechnology VI, Nov. 19, 2012, p. 21-29.*

(Continued)

*Primary Examiner* — Noah S Wiese
(74) *Attorney, Agent, or Firm* — Crowell & Moring LLP

(57) ABSTRACT

An electrophoretic deposition method of forming a boron nitride (BN) nanotube interface coating on ceramic fibers has been developed. The method comprises immersing first and second electrodes in a suspension including surface-modified BN nanotubes, where the first electrode includes ceramic fibers positioned on a surface thereof. The surface-modified BN nanotubes comprise BN nanotubes with an electrically charged polymer adsorbed on surfaces thereof. A voltage is applied to the first and second electrodes, and the surface-modified BN nanotubes move toward the first electrode and deposit on the ceramic fibers. After the deposition of the surface-modified BN nanotubes, the ceramic fibers are removed from the suspension and heat treated. Accordingly, a BN nanotube interface coating is formed on the ceramic fibers.

18 Claims, 1 Drawing Sheet

(51) Int. Cl.
*C25D 9/04* (2006.01)
*C04B 35/622* (2006.01)
(58) Field of Classification Search
CPC ...... C04B 2235/386; C04B 2235/5244; C04B 2235/616
See application file for complete search history.

(56) References Cited

OTHER PUBLICATIONS

Rehman et al. Electrophoretic deposition of carbon nanotubes: recent progress and remaining challenges. Electrophoretic deposition of carbon nanotubes: recent progress and remaining challenges, International Materials Reviews, 66:8, 533-562, DOI: 10.1080/09506608.2020.1831299.*

Qin et al. Field emission properties of electrophoretic deposition carbon nanotubes film. Applied Surface Science 255 (2009) 7618-762.*

Janet Hurst et al., "Boron Nitride Nanotubes Grown on Commercial Silicon Carbide Fiber Tow and Fabric," *Nanostructured Materials and Nanotechnology VI*, dated Nov. 19, 2012, pp. 21-29, published online by The American Ceramic Society at URL https://doi.org/10.1002/9781118217511.ch3.

Namir S. Raddaha et al., "Electrophoretic Deposition of Chitosan/h-BN and Chitosan/h-BN/TiO$_2$ Composite Coatings on Stainless Steel (316L) Substrates," *Materials*, vol. 7, Issue 3 (2014) pp. 1814-1829, published online by MDPI AG at URL https://doi.org/10.3390/ma7031814.

* cited by examiner

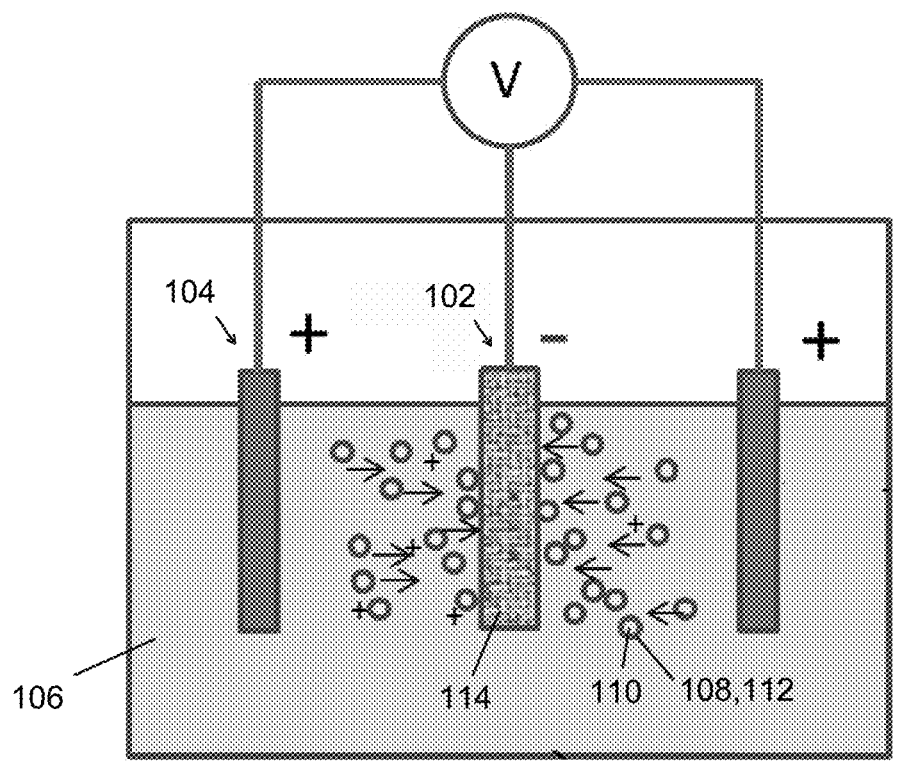

METHOD OF FORMING A BORON NITRIDE (BN) NANOTUBE INTERFACE COATING ON CERAMIC FIBERS

RELATED APPLICATION

The present patent document claims the benefit of priority under 35 U.S.C. § 119(e) to U.S. Provisional Patent Application No. 62/856,910, which was filed on Jun. 4, 2019, and is hereby incorporated by reference in its entirety.

TECHNICAL FIELD

The present disclosure relates generally to the fabrication of ceramic matrix composites and more particularly to the preparation of interface coatings on ceramic fibers.

BACKGROUND

Ceramic matrix composites, which include ceramic fibers embedded in a ceramic matrix, exhibit a combination of properties that make them promising candidates for industrial applications that demand excellent thermal and mechanical properties along with low weight. The ceramic fibers may be coated with an interface or "interphase" layer that provides a weak fiber-matrix interface and promotes matrix crack deflection, creating a tortuous path for cracking. This in turn consumes energy and improves the fracture toughness of the CMC. Interface coatings also protect the ceramic fibers from environmental damage during fabrication and high temperature use of the CMC. Boron nitride is a widely used interface coating material, although it may begin to oxidize at a temperature of about 600° C. depending on the crystallinity of the boron nitride. In addition, boron nitride interface coatings may exhibit instabilities upon moisture exposure, which can lead to a significant acceleration of strength degradation of the CMC. Accordingly, it would be beneficial to develop an interface coating which is chemically and mechanically stable in high-temperature oxidative and corrosive environments, such as in the environment of a gas turbine engine during operation.

BRIEF DESCRIPTION OF THE DRAWINGS

The embodiments may be better understood with reference to the following drawing(s) and description. The components in the figures are not necessarily to scale. Moreover, in the FIGURES, like-referenced numerals designate corresponding parts throughout the different views.

FIG. 1 is a schematic of an exemplary electrophoretic deposition process for producing a boron nitride nanotube interface coating on ceramic fibers.

DETAILED DESCRIPTION

A method of fabricating a boron nitride (BN) nanotube interface coating for ceramic fibers has been developed. The method, which may be described as an electrophoretic deposition process, comprises immersing first and second electrodes in a suspension including surface-modified BN nanotubes, where the first electrode includes ceramic fibers positioned on a surface thereof. The surface-modified BN nanotubes comprise BN nanotubes with an electrically charged polymer adsorbed on surfaces thereof. A voltage is applied to the first and second electrodes, and the surface-modified BN nanotubes move toward the first electrode and deposit on the ceramic fibers. After deposition of the surface-modified BN nanotubes, the ceramic fibers are removed from the suspension and heat treated. Accordingly, a BN nanotube interface coating is formed on the ceramic fibers.

The BN nanotube interface coating comprises BN nanotubes, which are structurally similar to carbon nanotubes but may provide increased chemical and thermal stability in high-temperature oxidative environments. BN nanotubes have a tubular atomic structure with boron (B) and nitrogen (N) atoms arranged in a hexagonal network. The BN nanotubes may be doped with silicon.

FIG. 1 is a schematic of an exemplary electrophoretic deposition process for producing a BN nanotube interface coating on ceramic fibers. The method includes immersing first and second electrodes 102, 104 in a suspension 106 including surface-modified boron nitride (BN) nanotubes 108. The surface-modified BN nanotubes 108 may comprise the BN nanotubes 110 described above with an electrically charged polymer 112 adsorbed on surfaces thereof. The electrically charged polymer 112 may be a positively charged polymer or a negatively charged polymer. The first electrode 102 includes ceramic fibers 114 positioned on a surface thereof to act as a substrate during electrophoretic deposition. The ceramic fibers 114, which are typically continuous ceramic fibers, may be arranged as a fiber tow, a fabric, and/or a fiber preform. Typically the ceramic fibers 114 comprise silicon carbide, although the fibers may also or alternatively comprise carbon, alumina, aluminosilicate, and/or another ceramic.

A voltage is applied to the first and second electrodes 102, 104 to induce electrophoretic motion of the surface-modified BN nanotubes 108. The applied voltage may be in a range from about 5 V to 50 V. The surface-modified BN nanotubes 108 move toward the first electrode 102 under the influence of the electric field and deposit on the ceramic fibers 114. The first electrode 102 may function as a cathode and the second electrode 104 may function as an anode, as illustrated in the example of FIG. 1, where the electrically charged polymer 112 is a positively charged polymer. Alternatively, the first electrode 102 may function as the anode and the second electrode 104 may function as the cathode, where the electrically charged polymer is a negatively charged polymer. Depending on the applied voltage and the deposition time, a coating of the surface-modified BN nanotubes 108 may be built up to a desired thickness on the ceramic fibers 114. Typically, the thickness of the coating is from about 0.05 micron to about 5 microns, or from about 0.1 micron to about 1 micron. The deposition may take place for a time duration from about 1 min to about 60 min, and preferably from about 1 min to about 10 min.

After deposition, the ceramic fibers 114 coated with the surface-modified BN nanotubes 108 are removed from the suspension 106 for a heat treatment to form a BN nanotube interface coating 216 on the ceramic fibers 214. During the heat treatment, the coated ceramic fibers 114 may be exposed to a temperature in a range from about 900° C. to about 1600° C. As a consequence of the elevated temperature exposure, the electrically charged polymer 112 adsorbed on the surfaces of the BN nanotubes 110 may be pyrolyzed and thus removed from the surfaces. In addition, the BN nanotubes may undergo sintering that promotes densification of the interface coating 216. Consequently, the ceramic fibers 214 coated with the BN nanotube interface coating 216 may exhibit increased thermal and moisture stability. These fibers may be referred to as "BN nanotube-coated fibers." The heat treatment may take place in a furnace or other controlled environment comprising a vacuum or inert gas atmosphere. Also or alternatively, the heat treatment may take place for a time duration from about 30 min to about 4 h.

As indicated above, the electrically charged polymer adsorbed on surfaces of the BN nanotubes may be a positively charged polymer, such as chitosan. When protonated, or positively charged, chitosan can be dissolved in an aqueous solution at low pH. Accordingly, the suspension may be an aqueous suspension, and may in some cases have a pH in a range from 2 to 5. The aqueous suspension may include, in addition to water, one or more additional liquid components, such as an acid and/or alcohol. Typically, the surface-modified BN nanotubes are incorporated in the suspension at a concentration from about 20 vol. % to about 60 vol. %. The electrically charged polymer (e.g., chitosan) and the BN nanotubes are available from various commercial sources.

A ceramic matrix composite (CMC) may be fabricated from the BN nanotube-coated fibers prepared as described above. More specifically, the CMC may comprise a matrix reinforced with BN nanotube-coated fibers. The matrix may comprise silicon carbide, silicon nitride, silicon nitrocarbide, and/or other ceramic compounds. A ceramic matrix composite that includes a matrix comprising silicon carbide and BN nanotube-coated fibers comprising silicon carbide may be referred to as a silicon carbide/silicon carbide composite or SiC/SiC composite. As used herein, the term "silicon carbide" may refer broadly to the compound SiC as well as to other silicon-containing carbides. The CMC may be a component of a gas turbine engine, such as a blade or vane.

A method of making such a CMC may include forming a ceramic fiber preform comprising a framework of ceramic fibers, and forming a BN nanotube interface coating on the ceramic fibers, as described above. Since the ceramic fibers undergoing electrophoretic deposition may be arranged as a fiber tow, a fabric, or a fiber preform, it is possible to form the BN nanotube interface coating on the ceramic fibers prior to or after forming the ceramic fiber preform. As would be known to one of skill in the art, fiber tows comprising ceramic fibers may be woven into fabrics or plies that may then be laid up to form a fiber preform of a desired configuration.

After forming the fiber preform including BN nanotube-coated fibers, a rigidized fiber preform may be prepared by applying a matrix material to the fiber preform during a chemical vapor infiltration process or another coating process known in the art. The rigidized fiber preform may then be infiltrated with a slurry comprising ceramic particles in a carrier liquid. The ceramic particles, which may comprise silicon carbide, silicon nitride, alumina, aluminosilicate, silicon nitrocarbide, boron carbide and/or another ceramic, are deposited within the fiber preform as matrix precursors, thereby forming an impregnated fiber preform. The slurry may also include reactive elements (e.g., carbon) that are deposited in the fiber preform for reaction during melt infiltration. For example, carbon may react with molten silicon or a molten silicon alloy to form a silicon carbide reaction product. After slurry infiltration, the impregnated fiber preform may undergo drying and/or heating to remove the carrier liquid, which is typically aqueous. During melt infiltration, the impregnated fiber preform is infiltrated with the molten material to form, upon cooling, a CMC comprising BN nanotube-coated ceramic fibers in a ceramic matrix.

As described in greater detail above, forming the BN nanotube interface coating entails immersing first and second electrodes in a suspension including surface-modified BN nanotubes, where the surface-modified BN nanotubes comprise BN nanotubes as described above with an electrically charged polymer adsorbed on surfaces thereof. The first electrode includes ceramic fibers (which may be arranged as a fiber tow, fabric or fiber preform) positioned on a surface thereof. A voltage is applied to the first and second electrodes, and the surface-modified BN nanotubes move toward the first electrode and deposit on the ceramic fibers. After the deposition, the ceramic fibers are removed from the suspension and heat treated, thereby forming a BN nanotube interface coating on the ceramic fibers.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to immersing first and second electrodes in a suspension including surface-modified boron nitride (BN) nanotubes, the first electrode including ceramic fibers positioned on a surface thereof, the surface-modified BN nanotubes comprising BN nanotubes with an electrically charged polymer adsorbed on surfaces thereof; applying a voltage to the first and second electrodes, the surface-modified BN nanotubes moving toward the first electrode and depositing on the ceramic fibers; after the deposition of the surface-modified BN nanotubes, removing the ceramic fibers from the suspension; and heat treating the ceramic fibers, thereby forming a BN nanotube interface coating on the ceramic fibers.

A second aspect relates to the method of the first aspect, wherein the electrically charged polymer comprises a positively charged polymer, and wherein the first electrode comprises a cathode.

A third aspect relates to the method of the second aspect, wherein the positively charged polymer comprises chitosan.

A fourth aspect relates to the method of any preceding aspect, wherein the ceramic fibers are arranged as a fiber tow, a fabric, or a fiber preform on the first electrode.

A fifth aspect relates to the method of any preceding aspect, wherein the ceramic fibers comprise silicon carbide fibers.

A sixth aspect relates to the method of any preceding aspect, wherein the suspension comprises a pH in a range from 2 to 5.

A seventh aspect relates to the method of any preceding aspect, wherein the suspension is an aqueous suspension.

An eighth aspect relates to the method of any preceding aspect, wherein a concentration of the surface-modified BN nanotubes in the suspension is from about 20 vol. % to about 60 vol. %.

A ninth aspect relates to the method of any preceding aspect, wherein the voltage is in a range from about 5 V to about 50 V.

A tenth aspect relates to the method of any preceding aspect, wherein the voltage is applied for a time duration in a range from about 1 min to about 60 min.

An eleventh aspect relates to the method of any preceding aspect, wherein the BN nanotube interface coating has a thickness in range from about 0.05 micron to about 5 microns.

A twelfth aspect relates to the method of any preceding aspect, wherein the heat treatment is carried out in a controlled environment comprising a vacuum or an inert gas atmosphere.

A thirteenth aspect relates to the method of any preceding aspect, wherein the heat treatment is carried out at a temperature in a range from about 900° C. to about 1600° C.

A fourteenth aspect relates to the method of any preceding aspect, wherein the heat treatment is carried out for a time duration in a range from about 30 min to about 4 h.

A fifteenth aspect relates to the method of any preceding aspect, wherein, during the heat treatment, the electrically charged polymer is pyrolyzed and thereby removed from the surfaces of the BN nanotubes.

A sixteenth aspect relates to a ceramic matrix composite (CMC) component comprising the ceramic fibers with the BN nanotube interface coating as made by the method of any of the preceding aspects.

A seventeenth aspect relates to a method of making a ceramic matrix composite (CMC) component, the method comprising: forming a fiber preform comprising a framework of ceramic fibers; forming a boron nitride (BN) nanotube interface coating on the ceramic fibers; forming a rigidized fiber preform; infiltrating the rigidized fiber preform with a slurry comprising ceramic particles, thereby forming an impregnated fiber preform; infiltrating the impregnated fiber preform with a molten material, wherein, upon cooling, a ceramic matrix composite (CMC) component is formed.

An eighteenth aspect relates to the method of the seventeenth aspect, wherein forming the BN nanotube interface coating on the ceramic fibers comprises: immersing first and second electrodes in a suspension including surface-modified boron nitride (BN) nanotubes, the first electrode including ceramic fibers positioned on a surface thereof, the surface-modified BN nanotubes comprising BN nanotubes with an electrically charged polymer adsorbed on surfaces thereof; applying a voltage to the first and second electrodes, the surface-modified BN nanotubes moving toward the first electrode and depositing on the ceramic fibers; after the deposition of the surface-modified BN nanotubes, removing the ceramic fibers from the suspension; and heat treating the ceramic fibers, thereby forming a BN nanotube interface coating on the ceramic fibers.

A nineteenth aspect relates to either of the seventeenth or eighteenth aspects, wherein the BN nanotube interface coating is formed on the ceramic fibers prior to forming the fiber preform.

A twentieth aspect relates to either of the seventeenth or eighteenth aspects, wherein the BN nanotube interface coating is formed on the ceramic fibers after forming the fiber preform.

In addition to the features mentioned in each of the independent aspects enumerated above, some examples may show, alone or in combination, the optional features mentioned in the dependent aspects and/or as disclosed in the description above and shown in the FIGURES.

What is claimed is:

1. A method of forming a boron nitride nanotube interface coating on ceramic fibers, the method comprising:
    immersing first and second electrodes in a suspension including surface-modified boron nitride (BN) nanotubes, the first electrode including ceramic fibers positioned on a surface thereof, the surface-modified BN nanotubes comprising BN nanotubes with an electrically charged polymer adsorbed on surfaces thereof, and a concentration of the surface-modified BN nanotubes in the suspension being from about 20 vol. % to about 60 vol. %;
    applying a voltage to the first and second electrodes, the surface-modified BN nanotubes moving toward the first electrode and depositing on the ceramic fibers;
    after the deposition of the surface-modified BN nanotubes, removing the ceramic fibers from the suspension; and
    heat treating the ceramic fibers, thereby forming a BN nanotube interface coating on the ceramic fibers.

2. The method of claim 1, wherein the electrically charged polymer comprises a positively charged polymer, and wherein the first electrode comprises a cathode.

3. The method of claim 2, wherein the positively charged polymer comprises chitosan.

4. The method of claim 1, wherein the ceramic fibers are arranged as a fiber tow, a fabric, or a fiber preform on the first electrode.

5. The method of claim 1, wherein the ceramic fibers comprise silicon carbide fibers.

6. The method of claim 1, wherein the suspension comprises a pH in a range from 2 to 5.

7. The method of claim 1, wherein the suspension is an aqueous suspension.

8. The method of claim 1, wherein the voltage is in a range from about 5 V to about 50 V.

9. The method of claim 1, wherein the voltage is applied for a time duration in a range from about 1 min to about 60 min.

10. The method of claim 1, wherein the BN nanotube interface coating has a thickness in range from about 0.05 micron to about 5 microns.

11. The method of claim 1, wherein the heat treatment is carried out in a controlled environment comprising a vacuum or an inert gas atmosphere.

12. The method of claim 1, wherein the heat treatment is carried out at a temperature in a range from about 900° C. to about 1600° C.

13. The method of claim 1, wherein the heat treatment is carried out for a time duration in a range from about 30 min to about 4 h.

14. The method of claim 1, wherein, during the heat treatment, the electrically charged polymer is pyrolyzed and thereby removed from the surfaces of the BN nanotubes.

15. A ceramic matrix composite (CMC) component comprising the ceramic fibers with the BN nanotube interface coating made by the method of claim 1.

16. A method of making a ceramic matrix composite (CMC), the method comprising:
    forming a fiber preform comprising a framework of ceramic fibers;
    forming a boron nitride (BN) nanotube interface coating on the ceramic fibers, the forming comprising:
        immersing first and second electrodes in a suspension including surface-modified boron nitride (BN) nanotubes, the first electrode including ceramic fibers positioned on a surface thereof, the surface-modified BN nanotubes comprising BN nanotubes with an electrically charged polymer adsorbed on surfaces thereof, and a concentration of the surface-modified BN nanotubes in the suspension being from about 20 vol. % to about 60 vol. %;

applying a voltage to the first and second electrodes, the surface-modified BN nanotubes moving toward the first electrode and depositing on the ceramic fibers;

after the deposition of the surface-modified BN nanotubes, removing the ceramic fibers from the suspension; and heat treating the ceramic fibers, thereby forming the BN nanotube interface coating on the ceramic fibers;

forming a rigidized fiber preform from the fiber preform;

infiltrating the rigidized fiber preform with a slurry comprising ceramic particles, thereby forming an impregnated fiber preform;

infiltrating the impregnated fiber preform with a molten material, wherein, upon cooling, a CMC comprising BN nanotube-coated ceramic fibers in a ceramic matrix is formed.

17. The method of claim 16, wherein the BN nanotube interface coating is formed on the ceramic fibers prior to forming the fiber preform.

18. The method of claim 16, wherein the BN nanotube interface coating is formed on the ceramic fibers after forming the fiber preform.

* * * * *